April 20, 1965     R. W. HOEPPEL     3,179,918
VEHICLE SPEED LIMITING AND CONTROL SYSTEM
Filed Feb. 24, 1959     2 Sheets-Sheet 1
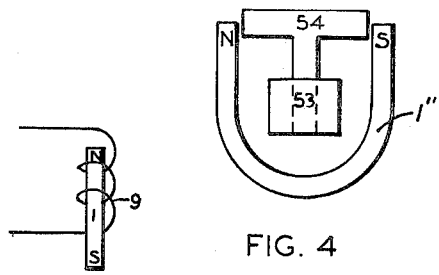
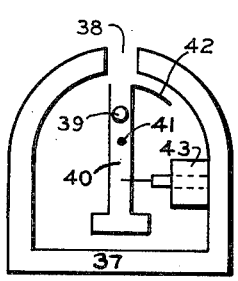
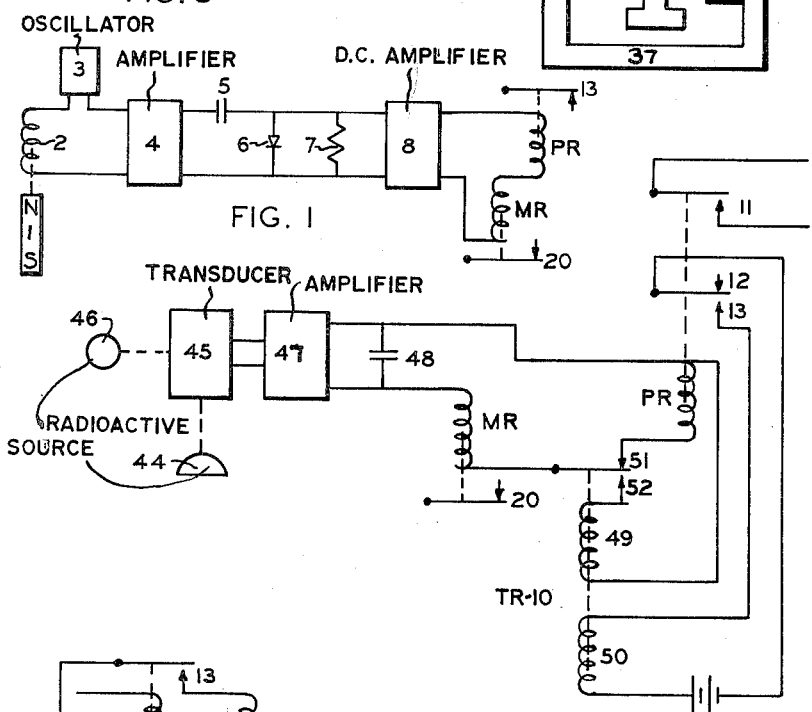
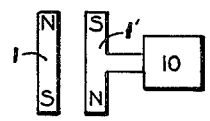
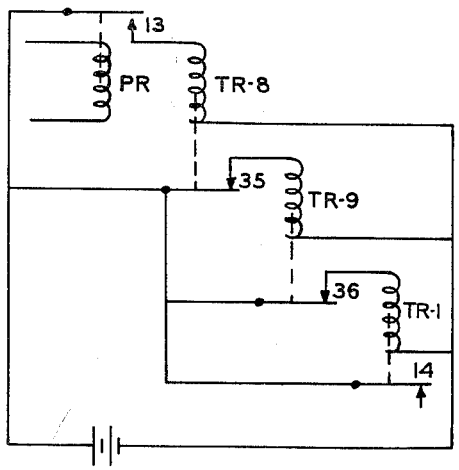
INVENTOR.
Raymond W. Hoeppel

United States Patent Office 3,179,918
Patented Apr. 20, 1965

3,179,918
VEHICLE SPEED LIMITING AND CONTROL SYSTEM
Raymond W. Hoeppel, P.O. Box 5, Oak View, Calif.
Filed Feb. 24, 1959, Ser. No. 794,929
8 Claims. (Cl. 340—32)

This invention relates generally to method and various systems for increasing the safety of traveling vehicles and is particularly addressed to the problem of limiting the speed of a railroad train in certain zones.

While the principles of this invention are applicable to any type of vehicle driven automatically or by an operator through a given path or zone, the invention will be described with respect to railroads.

A primary object of the invention is accordingly to provide a novel method of automatically indicating to the engineer of a railroad train whether or not a given speed limit in a zone is being exceeded while the train is passing through such zone.

Another object of the invention is to provide systems for carrying out the above method in which the predetermined or given speed along a given section of track or in a particular zone can be changed to provide the engineer with the desired warning without altering any portion of the mechanism within the train itself, whereby certain sections or zones of track may have their speed limits modified and the train engineer will still automatically be provided with a warning signal if the train is exceeding the modified speed limit.

Another object is to provide a device that will effect a control, such as a warning or brake application whenever any of a large number of speed limits is exceeded. Thus unlike some other safety devices of this nature, its function will not be restricted to two or three speed levels, but it will sense speed transgressions in any of numerous zones having a great variety of speed limits.

Still another object is to provide for automatic cessation of the warning and brake application or other means of control whenever the train has slowed down below the speed above which the control was effected.

Another object is to provide for a continuous check on the overall integrity of the functions of the device.

Another object is to provide for a multiplicity of controls, each being exercised at some fraction of the maximum speed limit. Such procedure can be used to operate a train automatically just below the maximum allowable speed.

Other objects are to provide various systems for carrying out the methods which are relatively inexpensive, extremely rugged, long lived, and substantially maintenance free. For instance, the ground control is simple and inexpensive and can be operated satisfactorily in only one line of path.

Still another object is to provide external control means wholly independent of the engineer or train for rendering operative or inoperative the indicating or control system.

Another object is to provide means for transmitting intelligence from vehicle to wayside or from wayside to vehicle.

In accordance with the method of the invention, at least two stationary actuating means are placed along a section of track or zone characterized by a given speed limit. The spacing between the stationary actuating means is equal to this given limiting speed multiplied by a first given time interval. In accordance with the next step of the method, a signal is provided on the train each time the train passes one of the actuating means so that a second interval of time equal to the time between each signal provided in the train is defined. In the third step of the method, a time interval is generated on the train equal to the first given time interval. Finally, these first and second time intervals are compared in a time discriminating device and a signal is generated only if the first time interval exceeds in time the second time interval.

In other embodiments, provisions are made to compare the second interval of time with several intervals, that may be longer or shorter than the first given time interval, with various types of control afforded dependent upon which of the standard intervals are longer than the second interval.

The signal generated by the time discriminating device may serve to sound an alarm, light a light, or by other means call attention to the engineer that the given speed limit in the particular zone is being exceeded. Coincidentally, the signal may actuate a counter whereby the number of transgressions of given speed limits of several different zones are counted. In other applications of the method, the generated signal may be employed to actuate the braking mechanism to decelerate the train, or to control power application to control train speed.

While many systems for carrying out the above method steps will occur to those skilled in the art, the present invention, like my co-pending application, Serial No. 708,241, filed Jan. 10, 1958, and now abandoned, contemplates among other things the use of permanent magnets for the stationary actuating means which may be rendered temporarily inactive by ground control means to be described later. These magnets are placed along the track in a line parallel to the direction of travel with at least one active pole erected vertically, and are spaced apart at such distance as the train will travel in the first given time interval when traveling at the maximum permissible rate of speed. On the train is a pickup coil, an electromagnetic solenoid transducer, located so that it comes in close proximity to each of the ground magnets as the train travels along the track. The resultant alternating current pulse induced in the coil when passing over a magnet is amplified, rectified, stabilized, and caused to pulse a relay which initiates a timing action in a time discriminator which in turn signals the engineer whenever the period between pulses is less than the first given time interval. As an added refinement, provision can be made for the brakes to apply in the event the period between pulses is less than a certain arbitrary percentage of the first given time interval. As a still further refinement the period between pulses may be compared with three or more standard time intervals of varying duration, which are some percentage of the first given time interval, and various types of control action effected dependent upon which of the standard intervals are longer than the period between pulses. The entire equipment on the train is constantly monitored and is "fail safe."

As alternate procedures, the pulse may be generated in the pickup coil located on the train in either of two other manners: (1) the coil may be wound on an open frame permanent magnet having a small air gap, such as a horseshoe magnet, and the pulse produced by a mass of soft iron or other ferromagnetic material on the ground which comes in close proximity to the air gap in the magnet as the train passes, thus causing a sudden change of flux in the coil by suddenly reducing the air gap between the poles, or (2) the coil may be wound on a soft iron open frame core having a small air gap, together with a second coil through which a current is continuously passed to continuously magnetize the soft iron core, in a manner set forth by W. K. Howe in U. S. 1,575,579 (page 3), with provision made to induce a pulse of current in the first coil in the above manner by passing the air gap in close proximity to a mass of soft iron located on the ground. In both above instances the mass of soft iron located on the ground can be temporarily rendered inactive, with regard to creating a pulse in the pickup coil on the train, by means of a low resistance external circuit in the manner set forth by Howe in the above patent (page 2).

In another alternate procedure the stationary actuating means is a small bit of radioactive material, having a long half life, located at definitely spaced intervals along the track in place of the magnets. In this instance, instead of using a pickup coil as a transducer, a radioactive material detector, such as a Geiger Mueller tube or a scintillator probe, is located on the train and caused to pass in close proximity to the radioactive material. The resultant pulse of current developed in the radioactivity detector, upon passing by the radioactive source, is then amplified by means of the circuitry outlined in FIGURE 7, and used to actuate the time discriminator in FIGURE 2, via relay PR. Other types of actuating means and transducers also can be used and will be discussed later.

A better understanding of the method as well as the contemplated systems for carrying out the method will be had by referring to the accompanying drawings in which:

FIGURE 1 is a block diagram showing the essential components of the transducer pickup, amplifying and monitoring systems.

FIGURES 3, 4 and 5 show methods of de-actuating the permanent magnets for ground control purposes.

FIGURE 6 shows a radioactive source that is capable of being de-actuated by solenoid control.

FIGURE 7 shows circuitry designed to stabilize pulse length produced by a proximity transducer that is actuated by a radioactive source.

FIGURE 8 shows a portion of a circuit for an alternative time discriminator similar to that shown in FIGURE 2. This circuit shows a method of delaying the energization of one of the main time delay relays until after cessation of pulse current.

Figure 2:
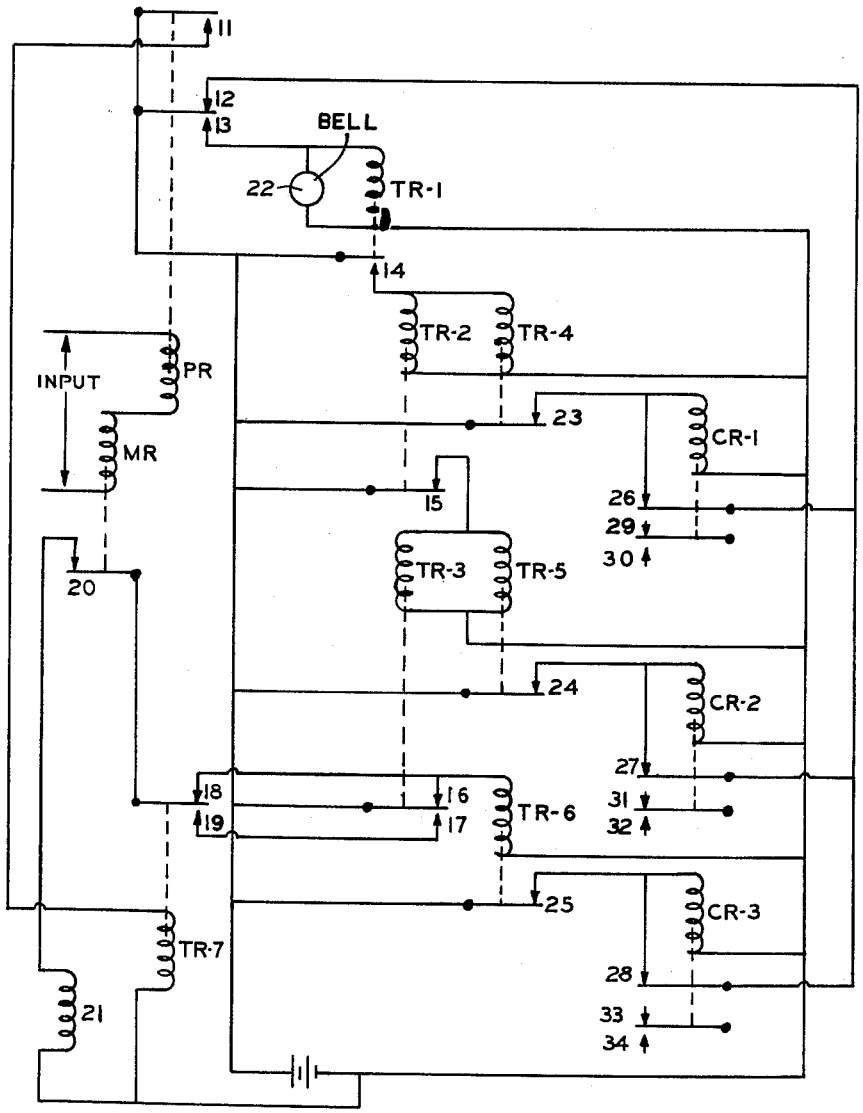
FIGURE 2 shows a time discriminator that may be used to evaluate the speed of the train with respect to the maximum permissible speed and to effect various controls. This schematic diagram shows some components of the monitoring system.

Referring to FIGURE 1, the pickup coil 2 is located on the train so that it passes within 1 to 5 inches of at least one of the poles of a ground magnet 1 which is one of a series of spaced ground magnets. The pulse induced into the coil as it passes by a magnet is amplified by means of an alternating current amplifier 4, is rectified by diode 6, stored in condenser 5 and dissipated in resistor 7 to produce a direct current pulse of constant length which in turn is further amplified by direct current amplifier 8 to produce a strong direct current pulse of constant length that is fed into relays PR and MR in series at the input of the discriminator (FIG. 2).

With this system, the pulse length is constant regardless of the speed of the train, provided of course, that the speed is sufficiently fast to produce a certain minimum power in the pickup coil. Speeds as slow as 10 m.p.h. are sufficient to actuate relay PR using ½" x 1" Alnico 5 magnets. With stronger magnets even slower speeds will actuate relay PR.

To monitor the circuit of FIGURE 1, a constant alternating current of low voltage is generated by a low impedance oscillator 3 and fed into the input to amplifier 4 in series with coil 2. It in turn is rectified by diode 6, amplified by amplifier 8 and fed into the discriminator (FIG. 1) to constantly actuate a sensitive monitor relay MR which is in series with pulse relay PR. A slightly less satisfactory arrangement is to place relays PR and MR in a parallel circuit, but this may be done. The current generated by oscillator 3 is adjusted so that it will constantly actuate relay MR but never actuate the less sensitive pulse relay PR. The pulse length, which is normally from .03 to 0.2 second, may be lengthened by increasing the capacitance of condenser 5 or increasing the resistance of resistor 7. The pulse current produced upon passing a stationary actuating means is sufficiently strong to operate pulse relay PR when amplified.

The amplifiers, 4 and 8 (FIG. 1), preferably are transistorized for sake of durability, dependability and minimum space requirements, but other types of amplifiers may be used. Preferably the input impedance of amplifier 4 should be low (less than 50,000 ohms), where an electromagnetic transducer is used. The oscillator 3 also may be transistorized, but any other low impedance source of alternating current may be used. Amplification is divided between alternating current and direct current amplifiers in order to reduce hum pickup and no-signal noise. If desired, a filter network can be inserted in the alternating current amplifier circuit to suppress interfering alternating current of a given frequency.

The permanent magnets preferably are rod or bar magnets, but may have other shapes. If stray fields are not excessive, and the air gap is low, and amplification is high, magnets weighing as little as 10 grams may be used.

*Operation of the time discriminator*

FIGURE 2 shows a schematic diagram of a multiple type time discriminator which will distinguish if the period between pulses produced by stationary actuating means is greater or less than each of three different timed intervals.

The relays in FIG. 2 are as follows:

Relay MR is a sensitive monitor relay with preferably a slight delay (about 0.1 second) in release and closure.

Relay PR is a less sensitive pulse relay with rapid release and closure. Its function is to initiate the action of the discriminator and checking time and to perform some of the functions of the discriminator.

Relay TR–1 closes rapidly but releases in a time T–1. It serves to time the shortest standard interval.

Relay TR–2 closes in time T–2 and releases rapidly. It supplements relay TR–1 to time the intermediate standard interval.

Relay TR–3 closes in time T–3 and releases rapidly. It supplements relays TR–1 and TR–2 to time the longest standard interval.

Relays TR–4, TR–5 and TR–6 close rapidly but release after a period slightly longer than the pulse length, T–P, of relay PR. Their purpose is to hold the control relays CR–1, CR–2 and CR–3, respectively, closed during the pulse interval, T–P, and to reset these relays after any excessive speed has been reduced to a tolerable speed.

Relays CR–1, CR–2 and CR–3 are electrically lock-in types with rapid closure and release. Their unconnected second pairs of contacts are used for control purposes, such control being exercised when these relays are released.

The horn solenoid 21, operates a valve which closes air input to a horn as long as it is energized; when de-energized, the horn blows.

Relay TR–7 closes rapidly and releases in a time, T–4, after de-energization, which time is made equal to the summation of times T–1 plus T–2 plus T–3. This relay is used only for checking purposes to detect any error in the timing accuracy of relays TR–1, TR–2 and TR–3, and to monitor certain components of the circuit.

While the train is standing still, or when no actuating means are along the track, relays PR, TR–1 and TR–7 are de-energized and all other relays are actuated as shown in FIGURE 2. The output of the direct current amplifier in FIG. 1 is connected to relays MR and PR as shown in FIG. 2. The monitoring relay MR always remains actuated, closing contacts 20, because of the weak signal into the input circuit of FIGURE 1 produced by the continuous running oscillator. The current that actuates relay MR is insufficient to actuate the less sensitive relay PR. Relay MR falls out only when some failure in the input circuit occurs.

Upon passing a stationary actuating means the resultant pulse produced momentarily actuates relay PR for a period T-P, momentarily closing contacts 11 and 13 and opening contacts 12.

Upon closure of contacts 11 the time checking relay TR-7 is closed, opening contacts 18 and closing contacts 19. Relay TR-7 remains closed for a period T-4 following opening of contacts 11.

Upon closure of contacts 13, bell 22 sounds, announcing passage of an actuating means, and relay TR-1 closes, opening contacts 14. Relay TR-1 remains closed for a period T-1 following opening of contacts 13.

Upon opening of contacts 12, no action occurs, provided contacts 23, 24 and 25 are closed, as is the case in normal operation of the discriminator when no error in speed occurs.

As contacts 14 open relay TR-2 releases, opening contacts 15. At the same time relay TR-4 is de-energized and it releases a short time after contacts 12 have been closed, after the pulse T-P, because of its delayed action, thus opening contacts 23. When contacts 23 open, however, relay CR-1 remains closed via an alternate path through contacts 26 and 12.

As contacts 15 open, relay TR-3 releases, opening contacts 16 and closing contacts 17, and a short time after contacts 12 have closed, relay TR-5 opens, opening contacts 24 in the same manner as relay TR-4 operated, and relay CR-2 remains closed, via contacts 12 and 27.

As contacts 16 open relay TR-6 is de-energized and it opens, a short time after contacts 12 have closed, opening contacts 25, and relay CR-3 remains closed via contacts 12 and 28.

In summary, upon reception of a pulse, relay TR-1 closes and relays TR-2 and TR-3 open, opening contacts 14, 15 and 16, but relays TR-4, TR-5 and TR-6 hold contacts 23, 24, and 25 closed during the period of the pulse, opening these contacts shortly thereafter, so that control relays CR-1, CR-2 and CR-3 remain closed via contacts 23, 24 and 25 respectively, during the pulse and via an alternate route through contacts 26 and 12, 27 and 12, and 28 and 12 respectively, after the pulse.

After a time T-1 following the end of the pulse, relay TR-1 releases, closing contacts 14, which re-energize relays TR-2 and TR-4. Relay TR-4 closes immediately, closing contacts 23, but relay TR-2 closes after a period T-2 following closure of contacts 14, thus closing contacts 15.

As contacts 15 close relay TR-5 closes, closing contacts 24 and after a time T-3, following closure of contacts 15 relay TR-3 closes, closing contacts 16 and opening contacts 17. Simultaneously relay TR-6 closes via contacts 16, closing contacts 25.

Thus within a period of T-1 plus T-2 plus T-3 after the pulse, relay TR-1 has opened and relays TR-2 and TR-3 have closed, closing contacts 14, 15 and 16 and 23, 24 and 25 and opening contact 17. Since relay TR-7 has a delayed release time T-4 which is made equal to the summation of periods T-1, T-2 and T-3, it releases at the same instant that relay TR-3 falls out. Thus a continuity of current is carried through the horn solenoid 21, via contacts 20, 18 and 16 before the pulse, and via contacts 20, 19 and 17 during the time T-4 following a pulse. If the summation of times T-1 plus T-2 plus T-3 is not equal to T-4, the current through the horn solenoid 21, will be interrupted for the period of the discrepancy, causing the horn, which is pneumatically operated, to sound for this period and indicating the development of an error in the timing period of one of these four main time delay relays.

If a second pulse is received in less than time T-1, the shortest time interval, indicating extreme speed, control relays CR-1, CR-2 and CR-3 all release as the pulse occurs, and remain released at least for the times T-1, T-2 and T-3 respectively, following their release.

The sequence leading to this action is as follows: In less than time T-1, relay TR-1 has not let released and consequently relays TR-2 and TR-3 are still released. Hence, contacts 14, 15 and 16 and 23, 24 and 25 are open. These latter three contacts serve as alternate paths to hold the control relays closed, the other path being through contacts 12. Thus when the pulse occurs, contacts 12 are opened momentarily and all three control relays fall out and remain fallen out after the pulse because contacts 26, 27 and 28 are opened. At the same time, relay TR-1 is reset via contacts 13 so that it will not release until period T-1 elapses.

If the third pulse comes in greater than period T-1 but less than the period T-1 plus T-2 following the second pulse, relay CR-1 will be pulled in and reset by contacts 23, as relay TR-1 releases after time T-1 and closes contacts 14, closing relay TR-4, but relays CR-2 and CR-3 will remain released because relays TR-2, TR-3, TR-5 and TR-6 have not yet closed, and contacts 24 and 25 are still open.

If the fourth pulse comes in greater than period T-1 plus T-2 and less than period T-1 plus T-2 plus T-3 after the third pulse, indicating the train is now traveling more slowly, relay CR-2 will now be reset by contacts 24 as relay TR-2 closes, closing relay TR-5, after time T-1 plus T-2, but relay TR-3 will remain released and relay CR-3 will not be reset because contacts 25 are still open. During all this time check relay TR-7 will remain closed, as each new pulse starts a new time cycle for this relay, as it does for the other three main time delay relays. Thus horn solenoid continuity is maintained.

If a fifth pulse comes in greater than period T-1 plus T-2 plus T-3, (period T-4) the train is now traveling slowly and relay CR-3 will be reset via contacts 25 as relay TR-3 closes after time T-4, closing relay TR-6. Simultaneously, as relay TR-3 closes, relay TR-4 opens and horn solenoid continuity is maintained.

In another illustration, should all control relays be closed, and should a second pulse come within a period greater than T-1 but less than T-1 plus T-2, relays CR-2 and CR-3 would be released but relay CR-1 would remain locked in. This is because relay TR-1 has now fallen out after time T-1, closing contacts 14 and closing contacts 23 via closing relay TR-4, thus holding relay CR-1 closed during the pulse, but relays TR-2 and TR-3 have not yet closed, so contacts 24 and 25 are open. Then when contacts 12 are opened, during the pulse, relays CR-2 and CR-3 fall out because both alternate paths of current through these relays are now open.

Likewise it can be shown that if this second pulse had come within a period greater than T-1 plus T-2 but less than T-1 plus T-2 plus T-3, relay CR-3 relay would open, and relays CR-1 and CR-2 would remain closed.

The control relays CR-1, CR-2 and CR-3 release at the highest train speed, relays CR-2 and CR-3 at an intermediate speed and relay CR-3 at a lower speed. The extra contacts on these relays can be used for control purposes. For instance, contacts 29 could be caused to apply brakes by connecting them in the brake solenoid circuit; then when relay CR-1 falls out these contacts would open and effect a release of air which would cause brakes to apply. Contacts 31 could be connected in the horn solenoid circuit to sound the horn when they open, indicating that the train speed was nearing the speed limit. Contacts 34 could be used to control power to the train motors, thus increasing power when train speed is slow and relay CR-3 releases. Thus time T-1 could be slightly less than the first given time interval, time T-1 plus T-2 could be slightly greater, and time T-1 plus T-2 plus T-3 could be still greater than the first given time interval. It should be noted that the time T-1 is measured from the beginning of the pulse, so when the pluse length is appreciable the actual delay period of relay TR-1 should be T-1 minus the pulse length T-P. Similarly, the actual delay period of relay TR-4 should be T-4 minus T-P.

In analyzing the above discriminator it is seen that relays TR-1, TR-2 and TR-3 mark off the three time intervals after a pulse, and relays TR-4, TR-5 and TR-6 serve to hold control relays CR-1, CR-2 and CR-3 closed during the pulse interval, to sensitize these relays and to reset these relays when the speed errors have been corrected.

Relays TR-4, TR-5 and TR-6 may be omitted if provision is made to actuate relays TR-1 and TR-7 shortly after the end of the pulse length T-P. In this instance, contacts 14, 15 and 16 would assume the function respectively of contacts 23, 24 and 25.

Two relays TR-8 and TR-9 could be used to provide this delayed switching (FIG. 8), although a number of other methods can be used. Relay TR-8 closes rapidly and releases in period T-5 after de-energization. Relay TR-9 closes in period T-6 after energization and releases rapidly. The period T-5 plus the pulse length T-P must be slightly greater than period T-6. The period T-6 must be slightly greater than the pulse length T-P.

Thus if the pulse length T-P is 0.1 second, T-6 is 0.2 second and T-5 is 0.2 second, then upon the beginning of the pulse, relay TR-8 closes immediately and 0.2 second later, relay TR-9 closes, closing relay TR-1. Relay TR-8 opens 0.2 second after the end of the pulse or 0.3 second after the beginning of the pulse, so contacts 35 have been closed for 0.3 second. Relay TR-9 therefore opens 0.3 second after the beginning of the pulse so that contacts 36 are closed for a period from 0.2 second to 0.3 second after the beginning of the pulse or for a total period of 0.1 second. Thus contacts 36 are closed after the pulse period T-P is over, and remain closed for 0.1 second, actuating relay TR-1 after the pulse period is over.

A similar pair of relays would have to be actuated by contacts 11 to drive the checking relay TR-7, the periods for the relays being identical to those driving relay TR-1. Relay TR-9 may be omitted in each instance if relays TR-1 and TR-7 are designed with a delay on closure of T-6, in addition to their delay on release.

This alternate method would be useful where a large number of timed intervals are involved, but the first method is probably more desirable where the number of timed intervals is not great. If this alternate method is used the actual time interval T-0 for relay TR-1 is made equal to T-1 minus T-P minus T-5 plus T-6 to compensate for the new delay times introduced. Similarly the actual time interval for relay TR-4 is made equal to T-4 minus T-P minus T-5 plus T-6. Thus relay T-4 will check all time intervals of all time delay relays.

It is possible to substitute a two coil polarized relay for relay PR, weakly biasing one winding so that the relay is actuated and so that contacts 11 and 13 are normally closed. Then when a pulse occurs the second coil is energized, driving relay PR momentarily to the released position. Contacts 11 then are used to actuate relay TR-7 which is now changed to close in T-4 seconds and release quickly. Contacts 13 are used to replace contact 12 (FIG. 2) and also drive relay TR-4 which is changed to close in time T-1 and release rapidly. Other changes in the circuit of FIGURE 2 that are required with this arrangement are: (1) contacts 16 and 17 are connected respectively to contacts 19 and 18, (2) contacts 14 are normally off instead of normally on, and (3) bell 22 is made to sound on de-energization.

Such a system would be quicker in some instances to effect a control action or warning in the event of component failure, but both this system and that of FIGURE 2 are "fail safe." The selection of either of these two methods will depend upon the type of timing devices used.

The above method also can be accomplished by using relay PR and making contacts 11 and 13 normally on by reversing their positions. In any of the above systems, relay MR remains connected in the output circuit of the amplifier as in FIGURE 2.

It is also possible to simultaneously initiate the operation of all three main time delay relays, TR-1, TR-2, and TR-3, by opening one pair of reverse-acting contacts, similar to contacts 12 on relay PR, when this relay pulses. Then upon de-energization, by opening the new reverse-acting contacts, these three relays fall out immediately and later close at times T-1, T-2, and T-3, respectively, closing contacts 14, 15, and 16, respectively. In this instance, it should be noted that relays T-2 and TR-3 operate similarly to relay TR-1, and not in a reverse manner, as is shown in FIGURE 2. Other changes in circuitry similar to those above would have to be made. However, to check such a circuit would require three checking time delay relays, each controlled by separate contacts on relay PR, instead of the one checking relay TR-7, since each main time delay relay operates independently of the others.

It is obvious that more than three standard time intervals with respective controls may be incorporated in the time discriminator of FIG. 2 by adding three additional relays, functioning as main time relay TR-3, repeater relay TR-6 and control relay CR-3, for each new standard time interval added. In this instance, contacts 16 and 17 are operated by the last main time relay added and the period of relay TR-7 is increased to correspond with the summation of the delay periods of all main time relays.

Where the alternate version of the discriminator is used, only two relays are added for each new standard time interval desired, namely a main time relay and a control relay. Again contacts 16 and 17 are operated by the last main time relay and the period of relay TR-7 is increased as above.

Where a large number of relays are used, the last main time relay which operates contacts 16 and 17 may fall out slightly after relay TR-7 pulls in, thus erroneously sounding the horn for a brief interval. This error can be corrected in this instance by using a delay circuit such as shown in FIGURE 8 to slightly delay the pull-in of relay TR-7.

If less than three standard time intervals and respective controls are desired, relays may be removed from the circuit of FIGURE 2. For instance, if one standard time interval is desired, relays TR-2, TR-3, TR-5, TR-6, CR-2 and CR-3 are eliminated, the interval of relay TR-7 is made identical to that of relay TR-1 and contacts 16 and 17 are operated by relay TR-1, care being taken to see that contacts 17 close as relay TR-1 closes. Relays similarly may be omitted from the alternate version of the discriminator if less than three speeds are to be analyzed.

If any component of the input circuit (FIG. 1) fails, or if relays PR or MR fail, the amplified and rectified oscillator current does not pass through relay MR and contacts 20 open, de-energizing the horn solenoid and sounding the horn. If any of the main time delay relays of FIGURE 2 develop errors, including also all of those shown in FIGURES 7 and 8, the horn will blow because of non-coincidence in the horn solenoid circuit between relays TR-3 and TR-7. If any component in the original or the alternate discriminator fails, either the horn will blow or control relays will release, thus "failing safe."

It will occur to one skilled in the art that some additional refinements may be added to the basic circuitry of the time discriminator, such as: (1) counters to totalize pulses received, brake applications and warning signals, (2) pilot lamps to indicate performance of relays, and (3) additional poles on some relays to eliminate overloading contacts.

The time delay relays used may be any of the following electromagnetic types: (1) pneumatic, (2) hydraulic, (3) mechanically-retarded or (4) resistance-capacitance types with or without amplification such as by transistors, thyratrons, vacuum tubes or magnetic amplifiers. Also a magnetic amplifier or transistor amplifier may serve as a time delay relay without using mechanical relays. Thermal time delay relays are of little value unless special provision is made to provide for rapid recycling and for uniform response under varying input voltages and ambient temperatures. A useful type of time delay relay involves the slow charging of a condenser via a resistor, which charge ultimately discharges a thyratron tube, which in turn activates an electromagnetic relay. All of the above types of timers are commercially available.

Also electrically or mechanically driven rotary timers can be used for effecting the time delays. One advantage of the rotary timer is that one timer may be used in place of several time delay relays; as such timers can perform several switching actions through the use of multiple cams.

A particularly useful type of rotary timer is the electrically reset type which is commercially available. This type consists of a series of cams, which operate the various switches, rotated via an electric clutch by a constant speed motor. Upon interruption of clutch power, a spring rapidly resets the cams to the starting position, and upon re-establishment of clutch power the timer begins its switching functions. In adapting this timer to the circuit of FIGURE 2, arrangement is made for relay PR to interrupt the clutch power momentarily during the pulse period, during which time the cams reset. This is done by using reverse-acting, normally closed contacts. At the end of the pulse, when relay PR releases, the clutch power is re-established and the timer begins its switching action. A single timer of this nature can be made to perform all of the switching actions of relays TR–1, TR–2, and TR–3. The performance of such a timer, of course, can be checked by relay TR–4, which again may be a second rotary reset timer.

It will occur to one skilled in the art that other types of stationary actuating means and their respective transducers may be employed in addition to those shown. For instance, any type of metal could be used as an actuating means and the transducer would be a metal detector of the familiar radio frequency type. Also, a light source (visible or invisible) could be used as an actuating means and a photocell or infra-red detector used as a transducer. In this latter connection, a more useful device would utilize a light source and photoelectric detector on the train and a reflector at the wayside as a stationary actuating means. Similarly, a microwave transmitter and receiver could be located on the train and a microwave reflector used at the wayside as an actuating means. Likewise, a high frequency sound source and receiver could be located on the train and a reflector used at the wayside as an actuating means. Also a metal projection at the wayside can make physical contact with a switch arm on the train, which serves as the transducer, and thus create a pulse of current, which would not require amplification.

Where any of these above remote action transducers are used the resultant pulse may be amplified by the means shown in FIGURE 1, where the transducer produces an alternating current signal, such as where sound or modulated light is the actuating means, and by the method shown in FIGURE 7, where the transducer produces a direct current signal, such as where a radioactive source is used as an actuating means, care being taken to match the impedances of the transducer and amplifier.

Where the transducer has a very high impedance, such as a Geiger Mueller or photoelectric tube, a better method of monitoring is to use the method shown in FIGURE 7, wherein a weak signal is constantly produced in the transducer by placing an actuating means on the train in the vicinity of the transducer. Such signal, when amplified is made not strong enough to actuate pulse relay PR but is made strong enough to constantly actuate the more sensitive relay MR. This method also can be used with the electromagnetic transducer by placing a coil carrying alternating current in the vicinity of the pickup coil 2 (FIGURE 1), instead of passing the alternating current signal through the pickup coil as in FIGURE 1.

Where transducers other than electromagnetic are used, the pulse length will vary widely dependent upon the speed of passing the stationary actuating means. As an extreme case, if the train happens to bring a non-magnetic transducer to a stop directly over the actuating means, the pulse will be very long, continuing as long as the train is stopped. Also, as explained above, an error in discriminator action is occasioned by varying the pulse width. Hence, it is advisable to stabilize the pulse width. The circuit shown in FIGURE 1 will stabilize the pulse width where electromagnetic transducers are used, but will not do so where other types are used.

Any pulse may be stabilized in width by a method employing one additional relay in addition to the pulse relay, according to a method shown by Crago (U.S. 1,913,699). Another satisfactory "fail safe" method is shown in FIGURE 7, where a radioactive actuating means is used; however, this same method may be used with any other type of transducer.

In FIGURE 7, a weak source of radioactivity of long half life 46 constantly actuates a radioactivity detector 45, which may be a Geiger Mueller tube or a photoelectric scintillator. The resultant direct current monitoring signal is amplified by direct current amplifier 47, stored in capacitor 48, and dissipated via a sensitive monitor relay MR and a less sensitive pulse relay PR, which are identical in action to relays MR and PR, respectively, shown in FIGURES 1 or 2. Thus relay MR has a slight delay on closure or release and relay PR closes and releases rapidly. However, for dependable results it is best that relay PR have a very slight delay on release of .01 to .02 second. A third relay TR–10 consists of two windings, 49 and 50, and this relay has a delay on closure and release, such delay being equal to the desired pulse length T–10. Either winding of relay TR–10 will actuate contacts 51 and 52, and either winding is approximately equivalent to the winding of relay PR in power and resistance. The monitoring signal keeps relay MR constantly closed but is too weak to actuate either relay MR or relay TR–10.

The action of the circuit of FIGURE 7 is as follows: Upon transducer 45 passing near a relatively strong radioactive source of long half life 44, located on the ground, a pulse of direct current is generated in transducer 45, said pulse varying in length with the speed of movement of transducer 45. This pulse, when amplified by amplifier 47 is stored in capacitor 48 to extend its length and it simultaneously causes relay PR to close, closing contacts 11 and 13 and opening contacts 12, which are components of the time discriminator circuit shown in FIGURE 2. Upon contacts 13 closing, winding 50 of relay TR–10 is energized, and after a period T–10 elapses, relay TR–10 closes, closing contacts 52 and opening contacts 51, which causes relay PR to release, thus opening contacts 11 and 13, and closing contacts 12, thus completing the timed pulse. When contacts 52 close, the current from the continuing initial pulse is directed to energize winding 49 of relay TR–10, and hence relay TR–10 remains pulled in for the duration of the initial pulse. When the initial pulse is over, relay TR–10 releases, closing contacts 51 and opening contacts 52 so that relay PR is reconnected to the amplifier. During all of this time the monitor relay MR has remained actuated, through the winding of relay PR before and during the timed pulse, and through the winding 49 of relay TR–10 after the timed pulse until the actual end of the received pulse. Thus a timed pulse of period T–10 is attained each time a new pulse is received from amplifier 47, regardless of the actual period of the received pulse, provided the received pulse is at least as long as period T–10.

*Remote control of actuating means*

It is often desirable to lower the normal speed limit over certain sections of track because of traffic ahead, weather conditions, maintainance work, etc. This may be accomplished by inserting additional stationary actuating means such as permanent magnets, soft iron masses, reflectors, or radioactive sources. Such insertion or removal may be done by manual or electrical means. Some electrical methods of control are shown below.

When a permanent bar magnet 1 is used, it may be temporarily de-activated by inserting it within a solenoid 9 carrying the required direct current to oppose its normal flux, and to aproximately nullify the field of the magnet, (FIG. 5). The field of the solenoid preferably is concentrated at the upper pole of the magnet. When the current is stopped the magnet again produces its flux above the pole, and becomes active with respect to the transducer above. This method is "fail safe," as when the current fails the magnet becomes active. For this purpose magnets of high coercive force, such as ceramic magnets, should be used.

Another method of de-activating a fixed permanent bar magnet 1 of high coercive force is shown in FIGURE 3, where a second bar magnet of similar strength 1', is rotated by means of a 180 degree rotary solenoid 10, so that the N and S poles are adjacent, thus diverting the flux from being thrown upward toward the pickup coil. When the solenoid is de-energized, magnet 1' is rotated 180 degrees by spring action within the solenoid so that its N and S poles are adjacent respectively to the N and S poles of fixed magnet 1, and thus a strong field is thrown upward. This method also is "fail safe."

Still another method of de-activating a permanent magnet is shown in FIGURE 4, which shows a permanent horseshoe magnet. However, two permanent bar magnets also may be used with opposite poles upward. A solenoid 53, when energized, pushes a soft iron armature 54 just above the poles of the magnet, diverting the field from above and largely nullifying the flux of the magnet in the vicinity of the pickup coil. Upon de-energization of solenoid 53 the armature is pulled downward out of the field of the magnet by gravity, or by spring action plus gravity, and the magnet again becomes active. This again is a "fail safe" method.

Where the pickup coil is wound around an open frame permanent magnet, and flux changed in the coil on passage by the air gap of a mass of soft iron, or other ferromagnetic material, this soft iron can be rendered inactive by inserting it inside a solenoid and shorting the solenoid according to a method shown by Howe (U.S. 1,575,579), and previously discussed. This method of Howe can also be used where the pickup coil is wound around a soft iron open frame similar to above and the frame magnetized by passing current through a second coil on the frame.

When a radioactive source is used as the stationary actuating means, the method shown in FIGURE 6 may be used to shield off the radioactivity and render the means inactive. The radioactive source 39 of long half life is placed within a tube 40 which rotates about the pivot 41, the pivot being above the center of gravity of the rotating mass. To this tube is attached a curved metal shield 42. The apparatus is housed within a metal covered chamber 37 with a small hole 38 on top immediately adjacent to the radioactive source when the rod is vertical, which is the active position. When an electromechanical solenoid 43 is actuated it pulls rod 40 about its pivot in a counter-clockwise direction, bringing the curved metal shield 42, over to cover the hole 38 in the top of chamber 37, which effectively shields off the radiation to the outside. The metal portions of tube 40, shield 42 and chamber 37, are of such thickness and density as to shield off the major portion of the radioactive emanation from source 39 to the transducer, when the solenoid is actuated. This method is "fail safe," as gravity moves the radioactive source to its active position when current in the solenoid is interrupted.

These electrically controlled stationary actuating means may be operated manually or automatically from a wayside station or signal. For instance, upon an amber signal, a series of normally inactive alternate actuating means, spaced midway between the normal speed actuating means, may be actuated, thus slowing the train down to half the normal speed. Or upon a red signal, still more controlled actuating means may be inserted, slowing the train down still more.

*Telemetering*

The above track control means can be used to convey intelligence into the train, in addition to its function in connection with speed control. Where intelligence only is to be coveyed, methods shown in FIGURE 1 or 7 may be used and no components of the discriminator circuit beyond pulse relay PR are employed. The monitoring relay MR is employed to constantly check on the integrity of the circuit. Thus one or more controlled magnets along the track, located in a different path from the speed control magnets, can be used to create one or more pulses of relay PR, which in turn can sound a warning, apply brakes, or perform some other control. Such pulses also can be used to drive a step relay to perform several functions by means of only one transducer, or they can be recorded mechanically on paper via solenoid-driven pens, recorded magnetically on tape, wire, drums or discs, or recorded physically on plastic discs. Where recorded physically, relay PR is replaced by an electromagnetic record cutting head, and where recorded magnetically this relay is replaced by a magnetic tape or wire recorder head.

Likewise, intelligence can be conveyed into the train by ground operation of the controlled radioactive source shown in FIGURE 6 and previously described, utilizing train-carried equipment as shown in FIGURE 7, and monitored by a method shown in FIGURE 7. Other types of transducers and their respective controlled actuating means also can be used, utilizing circuitry as shown in FIGURE 7, and substituting an actuating means to which the transducer responds, for the radioactive source 46 that will constantly actuate relay MR, but not relay PR.

Intelligence from the train to wayside also is possible with the above methods by utilizing one or more actuating means located on the train and by using the transducer, amplifier, control relays and monitoring system at the wayside. Thus the number of pulses received will correspond to the number of actuating means located on the train along a line parallel to travel. By using transducers and actuating means in several lines of path parallel to direction of travel, several actuating means can transmit a large amount of coded information. Each transducer, of course, must be so positioned that its respective train-carried actuating means will come in close proximity to it and yet it must be out of the influence of other train-carried transducers not intended to actuate it. By using controlled actuating means on the train, the information transmitted to the wayside can be easily changed at will by an operator on the train.

What is claimed is:

1. A vehicular control system comprising, in combination: at least two permanent magnets external of vehicle and positioned at a distance apart equal to the distance of travel of said vehicle during a first given time interval when travelling at the maximum permissible rate of speed; an electromagnetic proximity transducer located on said vehicle so that said transducer passes in close proximity to all of the magnets so as to induce an electrical pulse in said transducer each time a magnet is passed; amplifying means capable of being monitored to amplify said pulse and stabilize said pulse width; a time discriminator device on said vehicle responsive to said pulse comprising a pulse relay driven by said amplifying means, at least one essential timing means responsive to said pulse relay for establishing at least one standard time interval, at least one control relay held actuated by parallel switches controlled respectively by said pulse relay and said timing means; at least one means for keeping said control relay energized during the period of the pulse when speed is not excessive, said discriminator device providing at least one control action when said interval of time between successive pulses is less than at least one said standard time interval.

2. The subject matter of claim 1 including a means to check the accuracy of all essential timing means comprising at least one additional timing means for checking purposes which, by means of a coincidence circuit, produces an error signal when the period of any of the timing means is in error.

3. The subject matter of claim 1, including a monitoring means for constantly monitoring the integrity of said transducer and amplifying means, said monitoring means comprising a means for introducing an electrical signal into the circuit of said transducer, and a monitor relay in the output circuit of said amplifying means responsive to said signal, said pulse relay being unresponsive to said signal.

4. A vehicular control system according to claim 1 wherein at least one of said permanent magnets is permanently located in a solenoid that can be energized by a direct current of such polarity and amperage so as to approximately nullify the field of the magnet in the vicinity of said transducer while said current is flowing, said solenoid being located with respect to said magnet so that its opposing field is concentrated at the pole of said magnet that is closest to said transducer.

5. A vehicular control system according to claim 1 wherein at least one of said permanent magnets is a bar magnet mounted in the same axis and in close proximity to a second similar bar magnet, with electromechanical means to rotate the second magnet about its center axis so as to bring unlike poles together, thus reducing the external field of both magnets, with bias arrangement to automatically return the magnets to their normal active position, with like poles adjacent upon deactuation of said electromechanical means.

6. A vehicle control system according to claim 1, containing a plurality of essential timing means, each successive essential timing means being responsive to the essential timing means timing the next shorter period, so that the maximum standard period timed is equal to the sum of the timed periods for all essential timing means, and checking means to check the accuracy of said maximum standard period, said checking means comprising a checking timing means started and reset by independent switches on the pulse relay, said checking timing means having a period equal to the sum of the periods of all essential timing means, and a co-incidence circuit that produces an error signal during any period of discrepancy between the summation of the periods of the essential timing means and the period of the checking timing means.

7. A vehicle to wayside speed evaluating system comprising, in combination: two permanent magnets located on a vehicle a fixed distance apart and along one line of travel; an electromagnetic transducer located at the wayside in such position that said magnets pass in close proximity to said transducer; amplifying means to amplify pulses received in said transducer and to stabilize pulse width, said amplifying means being capable of being constantly monitored; and a time discriminator device for determining whether successive pulses fall within a period that is less than at least one standard first given time interval, said time discriminator comprising a pulse relay driven by said amplifying means, at least one essential timing means responsive to said pulse relay for establishing at least one standard time interval, at least one control relay held actuated by parallel switches controlled respectively by said pulse relay and said timing means; at least one means for keeping said control relay energized during the period of the pulse when speed is not excessive, said discriminator device providing at least one control action when said interval of time between successive pulses in less than at least one standard time interval.

8. A vehicle control system comprising in combination at least two stationary permanent magnets external of said vehicle in line with the direction of travel of said vehicle and positioned at a distance apart that the vehicle would travel in a first given time interval when traveling at the maximum permissible rate of speed; an electromagnetic proximity transducer on the vehicle that generates an electrical pulse when passing in close proximity to each of said stationary magnets; means to amplify said pulse and stabilize the length of said pulse; a time discriminator device for discriminating whether successive pulses fall within a period that is less than at least one standard period that is a definite percentage of the first given time interval, said time discriminator device comprising a pulse relay which is actuated for a constant interval by each pulse, at least one essential timing means to mark off at least one standard period, said time discriminator device and said timing means being reset and started by switches on the pulse relay, at least one control relay for each essential timing means which effects control when de-energized, each control relay being held energized by alternate paths through a switch controlled by its respective essential timing means and through switches on the pulse relay, means to hold all control relays energized during the pulse interval when speed is not excessive, and to re-energize the control relays when speed is not excessive, and means to check the accuracy of said essential timing means after every pulse, said means comprising at least one additional checking timing means reset and started by an independent set of switches on the pulse relay which, through a coincidence circuit, produces an error signal during any period of discrepancy between the period of the checking timing means and that of any other essential timing means; and means to constantly monitor the integrity of the input and discriminator circuits.

References Cited by the Examiner
UNITED STATES PATENTS

| | | | |
|---|---|---|---|
| Re. 23,896 | 11/54 | Higgins | 340—53 |
| 2,145,042 | 1/39 | Dimond | 324—68 |
| 2,269,603 | 1/42 | Rockwood | 324—68 |
| 2,284,850 | 6/42 | Smith | 340—53 |
| 2,446,870 | 8/48 | Davis | 340—263 |
| 2,623,163 | 12/52 | Bone | 340—263 |
| 2,883,108 | 4/59 | Thornton | 235—92 |
| 2,903,684 | 9/59 | McLintock | 340—263 |
| 2,994,764 | 8/61 | Witmer et al. | 246—2 XR |
| 3,016,456 | 1/62 | Corporon | 246—2 |

FOREIGN PATENTS 390,389   4/33   Great Britain.

NEIL C. READ, *Primary Examiner.*

LEO QUACKENBUSH, BENNETT G. MILLER,
*Examiners.*